(12) United States Patent
Takezawa (10) Patent No.: US 11,073,244 B2
(45) Date of Patent: Jul. 27, 2021

(54) FILLING APPARATUS

(71) Applicant: TATSUNO CORPORATION, Tokyo (JP)

(72) Inventor: Masahiro Takezawa, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 0 days.

(21) Appl. No.: 16/620,827

(22) PCT Filed: Oct. 1, 2018

(86) PCT No.: PCT/JP2018/036702
§ 371 (c)(1),
(2) Date: Dec. 9, 2019

(87) PCT Pub. No.: WO2019/150650
PCT Pub. Date: Aug. 8, 2019

(65) Prior Publication Data
US 2021/0140587 A1    May 13, 2021

(30) Foreign Application Priority Data
Jan. 30, 2018 (JP) .............................. JP2018-013254

(51) Int. Cl.
*B67D 7/42* (2010.01)
*F17C 13/04* (2006.01)
(Continued)

(52) U.S. Cl.
CPC ............... *F17C 13/04* (2013.01); *B67D 7/42* (2013.01); *F17C 5/06* (2013.01); *F17C 13/002* (2013.01);
(Continued)

(58) Field of Classification Search
CPC ...... F17C 2205/037; F17C 13/04; F17C 5/06; F17C 13/002; F17C 2260/036;
(Continued)

(56) References Cited

U.S. PATENT DOCUMENTS

2005/0167981 A1* 8/2005 Nuttall ................... F16L 37/35
285/316
2018/0299055 A1* 10/2018 Thomas ................ F16K 15/063

FOREIGN PATENT DOCUMENTS

JP   2001343022 A   12/2001
JP   2004052996 A    2/2004
(Continued)

OTHER PUBLICATIONS

International Search Report for PCT/JP2018/036702; dated Nov. 20, 2018.

*Primary Examiner* — Jason K Niesz
(74) *Attorney, Agent, or Firm* — Stetina Brunda Garred and Brucker; Mark B. Garred (57) ABSTRACT

A filling apparatus capable of suppressing radial movement of a connecting pin of a nozzle, and preventing damages and deformations (recesses and so on) from generating on an outer peripheral surface of the connecting pin, and making the filling nozzle compact. The filling apparatus (100) according to the present invention includes: a storage tank for storing hydrogen fuel; a filling nozzle (10) for filling hydrogen from the storage tank through a fuel filling system to an in-vehicle hydrogen filling tank mounted on a vehicle; a rod-shaped member (2: connecting pin) and a main body portion (1) mounted on the filling nozzle (10); a sealing member (3: laminated sealing member) arranged on (a radially outer peripheral portion of the rod-shaped member) of the main body portion (1); a sealing member holding member (4: pressing member) mounted on an end side (on a receptacle 20 side) of the rod-shaped member (2); and a (Continued)

mechanism for protecting an outer peripheral surface of the rod-shaped member (2) from slide on the sealing member holding member (4).

7 Claims, 5 Drawing Sheets

(51) Int. Cl.
 *F17C 5/06* (2006.01)
 *F17C 13/00* (2006.01)
(52) U.S. Cl.
 CPC ............... *F17C 2205/037* (2013.01); *F17C 2205/0323* (2013.01); *F17C 2221/012* (2013.01); *F17C 2260/036* (2013.01); *F17C 2265/065* (2013.01); *F17C 2270/0168* (2013.01)
(58) Field of Classification Search
 CPC ........ F17C 2221/012; F17C 2270/0168; F17C 2205/0323; F17C 2265/065; B67D 7/42
 USPC .................................. 141/349, 353
 See application file for complete search history.

(56) References Cited

FOREIGN PATENT DOCUMENTS

| | | | |
|---|---|---|---|
| JP | 2004293777 | A | 10/2004 |
| JP | 2005069361 | A | 3/2005 |
| JP | 2009156371 | A | 7/2009 |
| JP | 2010133497 | A | 6/2010 |

\* cited by examiner

FILLING APPARATUS

CROSS-REFERENCE TO RELATED APPLICATIONS

The present application claims priority to International Application No. PCT/JP2018/036702 filed Oct. 1, 2018, which claims priority to and Japanese Patent Application No. 2018-013254 filed Jan. 30, 2018, the disclosures of which are incorporated herein by reference.

STATEMENT RE: FEDERALLY SPONSORED RESEARCH/DEVELOPMENT

Not Applicable

BACKGROUND

1. Technical Field of the Invention

The present invention relates to a filling apparatus for filling a gas such as hydrogen gas used for fuel or the like.

2. Description of the Related Art

Figure 6:
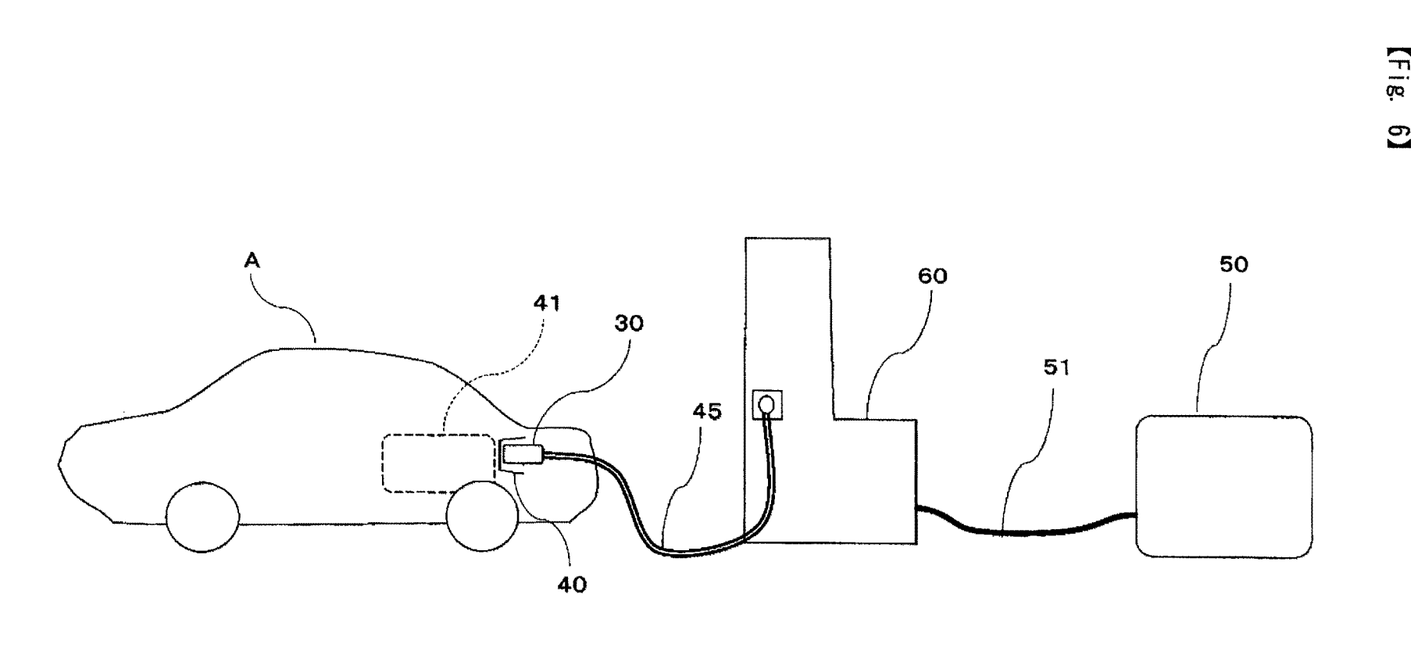
FIG. 6 is an explanatory view of a hydrogen filling apparatus according to the conventional technique.

For example, to a vehicle using hydrogen as fuel, as shown in FIG. 6, at a hydrogen filling station with a hydrogen storage tank 50 and a fuel filling system (having a dispenser 60, a filling hose 45 and so on) is filled a hydrogen gas after a filling nozzle 30 and a receptacle 40 as a vehicle side filling port are connected with each other. The filling is performed under control depending on the maximum using pressure of a hydrogen tank 41 mounted in a vehicle A. In addition, in FIG. 6, the numeral 51 shows a piping system for feeding hydrogen from the hydrogen storage tank 50 to the dispenser 60. This type of hydrogen filling apparatus has already been proposed by the present applicant in Patent document 1 for instance, and the apparatus is effective.

In a conventional hydrogen filling apparatus, when a nozzle of the hydrogen filling apparatus and a receptacle (vehicle side socket) are connected with each other, a connecting pin of the nozzle is pressed by the receptacle to open a valve, and hydrogen flows on the receptacle side. Then, in order to prevent a hydrogen gas from leaking via an outer peripheral surface of the connecting pin, a laminated sealing member (cup seal) is mounted. Here, in order to suppress radial movement of the connecting pin of the nozzle (so-called "rattling") and properly connect the nozzle with the receptacle, in the conventional hydrogen filling apparatus, in a main body portion on the nozzle side is mounted a guide member projecting in a radially inner direction of the main body portion, and slide of the connecting pin on an inner peripheral surface of the guide member suppresses radial movement of the connecting pin.

However, since the radially inner peripheral surface of the guide member and the connecting pin slide with each other, repetition of opening and closing of the valve causes a sliding portion of the connecting pin to be damaged and deformed (recessed). Then, there is a problem that the damages and the deformations on a radially inner side region of the laminated seal cause leakage of hydrogen outside the nozzle through the damages and the deformations. In addition, due to installation of the guide member, axial dimension of the connecting pin must be lengthened by that amount, so that making the filling nozzle compact is inhibited also. In the above hydrogen filling apparatus (refer to Patent document 1), solutions to the problems are not described at all.

Prior Art patent document 1: Japanese Patent Publication No. 2014-109350 gazette.

BRIEF SUMMARY

The present invention has been proposed in consideration of the above problems in the prior art, and the object thereof is to provide a filling apparatus capable of suppressing radial movement of a connecting pin of a nozzle, and preventing damages and deformations (recess and so on) from generating on an outer peripheral surface of the connecting pin, and making the filling nozzle compact.

A filling apparatus (100) according to the present invention is characterized by including: a storage tank for storing hydrogen fuel; a filling nozzle (10) for filling hydrogen from the storage tank through a fuel filling system to an in-vehicle hydrogen filling tank mounted on a vehicle; a rod-shaped member (2: connecting pin) and a main body portion (1) mounted on the filling nozzle (10), in the rod-shaped member (2) flowing a hydrogen, the main body portion (1) covering the rod-shaped member (2); a sealing member (3: laminated sealing member) arranged between the main body portion (1) and the rod-shaped member (2); and a sealing member holding member (4-1) mounted on an end side of the rod-shaped member (2), the sealing member holding member (4-1) sandwiched by two holding members (17, 18), the sealing member holding member (4-1) sliding an outer peripheral surface of the rod-shaped member (2) while protecting the outer peripheral surface, and each of the two holding members (17, 18) screwed with the main body portion (1) under a condition that an inner peripheral surface thereof separated from the outer peripheral surface of the rod-shaped member (2).

Here, the mechanism for protecting the outer peripheral surface of the rod-shaped member (2) from slide on the sealing member holding member (4) can be constituted by coating a radially inner periphery surface of the sealing member holding member (4: pressing member) with a material (resin, Al or Cu, for instance) whose hardness is lower than that of a material (for example, stainless steel) of the rod-shaped member (2). Or, the mechanism can be constituted by coating the surface of the rod-shaped member (2) with a material (glass or carbon-based material, for instance) whose hardness is higher than that of a material (for example, stainless steel) of the sealing member holding member (4: pressing member).

In the present invention, it is preferable that a valve element (2A) mounted on a fuel filling system side end portion of the rod-shaped member (2: connecting pin), and an elastic material (5) for energizing the valve element (2A) in a direction that a valve is closed.

When the present invention is carried out, it is preferable that the filling apparatus includes a clutch mechanism (12) for maintaining a connected state between the filling nozzle (10) and the vehicle side filling port (20).

With the present invention with the above construction, radial movement of the rod-shaped member (2) (so-called "rattling") can be prevented by a periphery of a portion where the rod-shaped member (2) penetrates the main body portion (1) as well as the inner peripheral surface of the sealing member holding member (4: pressing member). Then, with the mechanism for protecting the outer peripheral surface of the rod-shaped member (2) from slide on the sealing member holding member (4), even if opening and closing of the valve in the filling nozzle (10) are repeated, damages and deformations (recesses and so on) are not generated on a portion where the rod-shaped member (2) and the sealing member holding member (4) slide with each other, and even if the portion where the rod-shaped member (2) and the sealing member holding member (4) slide with each other locates on a radially inner side region of the laminated seal (3), on the surface of the rod-shaped member (2) do not exist damages and deformations, so that a gas (such as hydrogen) does not leak out of the nozzle (10).

In addition, since the present invention has a function of preventing the sealing member holding member (4) from moving in a radial direction of the rod-shaped member (2) (so-called "rattling"), it is not necessary to separately mount a guide member projecting in a radially inner direction on the main body portion (1) of the nozzle (10), and a movement margin for opening and closing of the valve between the guide member and the laminated seal. As a result, with the present invention, it is easy to make an axial dimension of the rod-shaped member (2) of the filling nozzle (10) small, which easily makes the whole filling apparatus compact.

DETAILED DESCRIPTION

Figure 1:
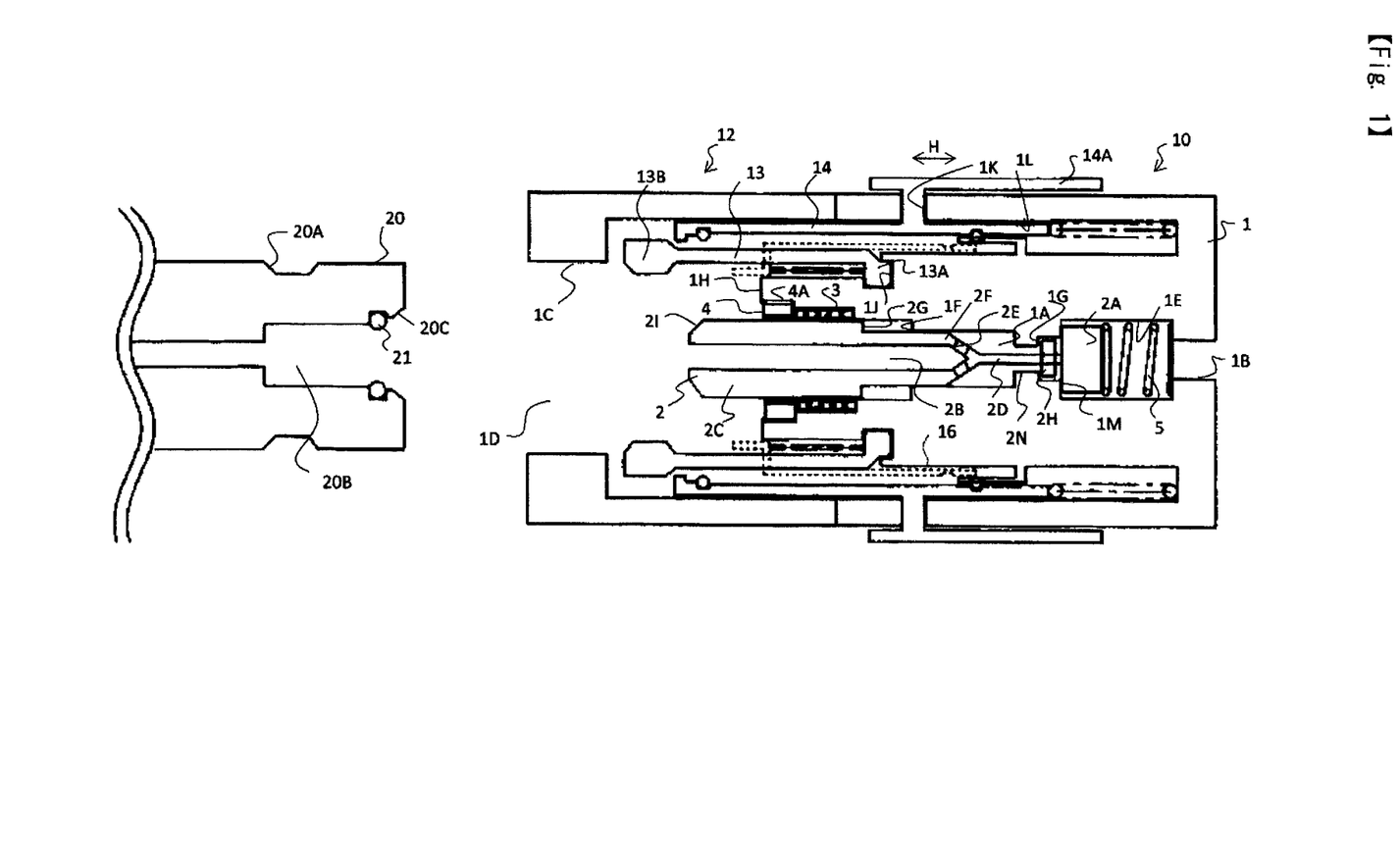
FIG. 1 is a cross sectional view showing a condition that a filling nozzle in a reference example of the present invention is separated from a vehicle side filling port.
Figure 2:
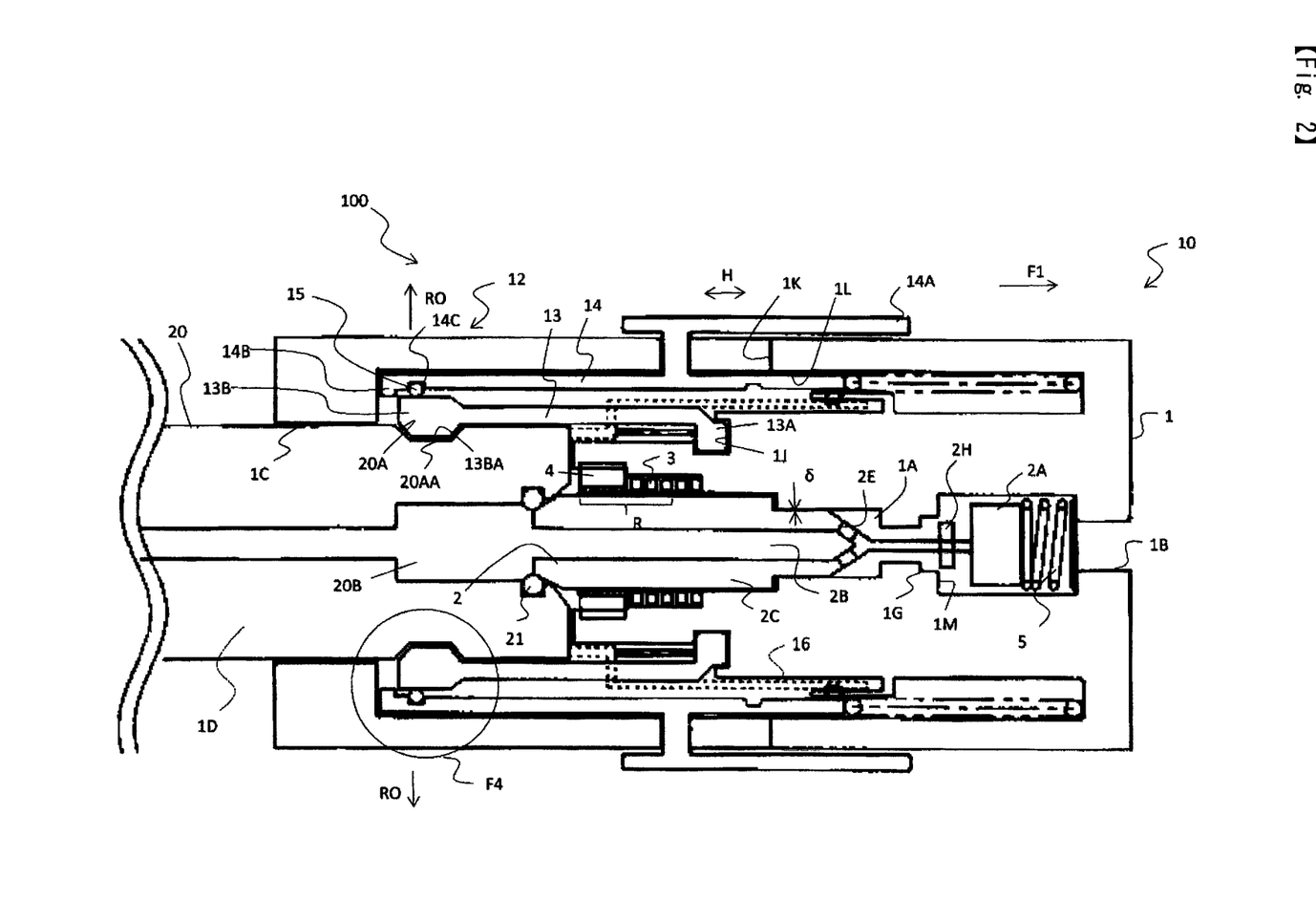
FIG. 2 is a cross sectional view showing a condition that the filling nozzle in the reference example is connected to the vehicle side filling port.

Hereinafter, a reference example and an embodiment of the present invention will be explained with reference to the attached drawings. In FIG. 1, a filling nozzle 10 fills hydrogen from a hydrogen fuel storage tank not shown through a fuel filling system (having a dispenser 60, a filling hose 45 and so on, refer to FIG. 6) to an in-vehicle hydrogen filling tank 41. The filling nozzle 10 has a pipe joint main body 1 (hereinafter referred to as "main body portion"), and on a central portion (a central portion in the vertical direction in FIG. 1) of a hydrogen supply source side (right side in FIG. 1) end portion of the main body portion 1 is formed a hydrogen introducing port 1B. Then, on a receptacle side 20 (on a vehicle side filling port side, left side in FIG. 1) end portion of the main body portion 1 is formed an opening 1C. Into the opening 1C is inserted the receptacle 20. Then, as shown in FIG. 2, when the filling nozzle 10 and the receptacle 20 are connected with each other (when hydrogen is filled, for instance), the receptacle 20 is situated in a receptacle insertion space 1D shown in FIG. 1.

In FIG. 1, on a central portion in a vertical direction of the main body portion 1 is formed an in-main-body passage 1A extending from the hydrogen introducing port 1B to the receptacle insertion space 1D, and in the in-main-body passage 1A is accommodated a rod-shaped member (connecting pin) 2. On the end portion of the rod-shaped member 2 on the hydrogen supply source side (right side in FIG. 1, not shown in FIG. 1) is attached a valve element 2A, which is accommodated in a valve element accommodating portion 1E of the in-main-body passage 1A. In the valve element accommodating portion 1E, on the hydrogen supply source side (right side in FIG. 1) of the valve element 2A is arranged a spring 5 as an elastic material. The valve element 2A, a valve seat 1M constituted by a step portion at an end portion (left end portion in FIG. 1) of the valve element accommodating portion 1E and the spring 5 constitute a valve mechanism.

The rod-shaped member 2 can slide in the in-main-body passage 1A in a horizontal direction in FIG. 1, and in a condition that the filling nozzle 10 is not connected to the receptacle 20 as shown in FIG. 1, the valve element 2A is urged by an elastically repulsive force of the spring 5 to the receptacle 20 side (left side in FIG. 1), and seats on the valve seat 1M constituted by the step portion at the end portion (left end portion in FIG. 1) of the valve element accommodating portion 1E, and the valve mechanism (including the valve element 2A and so on) closes. The rod-shaped member 2 is hollow, and the hollow portion constitutes an in-rod passage 2B. Then, the rod-shaped member 2 has a large diameter portion 2C, a small diameter portion 2D, the valve element 2A and a diameter changing portion 2F, and on the diameter changing portion 2F is formed an opening 2E, and the large diameter portion 2C and the small diameter portion 2D are connected by the diameter changing portion 2F. When hydrogen gas is filled (refer to FIG. 2) the hydrogen gas flows from a dispenser (not shown in FIGS. 1 and 2, refer to FIG. 6) through the valve mechanism constituted by the valve element 2A and so on into the in-main-body passage 1A. The hydrogen gas flowing into the in-main-body passage 1A flows through the opening 2E of the rod-shaped member 2 into the in-rod passage 2B.

On the large diameter portion 2C of the rod-shaped member 2 is formed a step portion 2G, and when the filling nozzle 10 and the receptacle 20 are connected with each other, the step portion 2G engages with a step portion 1F of the main body portion 1. To the small diameter portion 2D of the rod-shaped member 2 is fixed a nut member 2H, and the engagement between the nut member 2H and a convex portion 1G of the main body portion 1 (or an end portion of a small diameter passage 2N continuing the in-rod passage 2B) prevents the rod-shaped member 2 from detaching on the receptacle side (left side in FIG. 1) when hydrogen is filled. In the main body portion 1, a sliding portion of the large diameter portion 2C of the rod-shaped member 2, a portion opposing to an outer peripheral surface of the nut member 2H, and an inner peripheral surface of a sealing member holding member 4 (pressing member) described below suppress radial movement of the rod-shaped member 2 (so-called "rattling") together with corresponding portions of the rod-shaped member 2.

In FIG. 1, in the main body portion 1, in a region opposing to a radially outer peripheral portion of the large diameter portion 2C of the rod-shaped member 2 is arranged a sealing member 3 (laminated sealing member: that is, "cup seal"). The cup seal 3 is arranged near a receptacle 20 side (left side in FIG. 1) end surface 1H of the main body portion 1, and an inner diameter of the cup seal 3 is set to be almost the same as an outer diameter of the large diameter portion 2C (on the receptacle side (left side in FIG. 1) from the step portion 2G) of the rod-shaped member 2, and the large diameter portion 2C is slidable in the cup seal 3.

Adjacent to the end surface 1H side (left side in FIG. 1) of the cup seal 3 is mounted a sealing member holding member 4. The sealing member holding member 4 is fixed to an inner periphery of the main body portion 1, and the symbol 4A indicates a male screw formed on the sealing member holding member 4. Meanwhile, as means for fixing the sealing member holding member 4 to the inner periphery of the main body portion 1, well-known means except for the screw can be adopted. The sealing member holding member 4 has a function of suppressing radial movement of the rod-shaped member 2 (so-called "rattling"), and holding the cup seal 3 to prevent it from moving on an end side (left side in FIG. 1: receptacle 20 side) of the rod-shaped member 2.

In FIG. 2, when the nozzle 10 and the receptacle 20 are connected with each other, an engaging portion 2I (FIG. 1) on the end side (receptacle side: left side in FIGS. 1 and 2) of the rod-shaped member 2 contacts an engaging portion 20C (FIG. 1) on an end side of the receptacle 20 (nozzle side: right side in FIGS. 1 and 2), and the rod-shaped member 2 moves from the position shown in FIG. 1 rightward in FIGS. 1 and 2 (in a direction separated from the receptacle 20). The numeral 21 indicates an O-ring. The O-ring 21 is a sealing member for preventing hydrogen gas flowing from the in-rod passage 2B to an in-receptacle passage 20B from leaking via a predetermined passage when the main body portion 1 (nozzle 10) and the receptacle 20 are connected with each other. When the rod-shaped member 2 moves from the position shown in FIG. 1 rightward in FIGS. 1 and 2, the rod-shaped member 2 moves until the step portion 2G (FIG. 1) of the large diameter portion 2C of the rod-shaped member 2 contacts the step portion 1F (FIG. 1) of the main body portion 1.

When the rod-shaped member 2 moves from a condition shown in FIG. 1 rightward in FIGS. 1 and 2, the valve element 2A mounted on an end of the rod-shaped member 2 separates from the valve seat 1M against the elastically repulsive force of the spring 5 to open the valve of the valve mechanism. Then, via the valve mechanism whose valve opens, high pressure hydrogen gas supplied from a hydrogen supply source not shown in FIGS. 1 and 2 flows from the hydrogen introducing port 1B into the in-main-body passage 1A. The hydrogen gas flowing into the in-main-body passage 1A flows via the opening 2E of the rod-shaped member 2 and the in-rod passage 2B to the in-receptacle passage 20B, and is supplied to the in-vehicle hydrogen filling tank 41 (FIG. 6) not shown in FIG. 2.

In FIG. 2, when the hydrogen gas flows into the in-main-body passage 1A and the in-rod passage 2B, the hydrogen gas may flow into a clearance δ between an outer peripheral surface of the large diameter portion 2C of the rod-shaped member 2 and an inner surface of the in-main-body passage 1A to leak outside the main body portion 1 without flowing from the opening 2E to the in-rod passage 2B of the rod-shaped member 2. In order to prevent the leakage of the hydrogen gas, the cup seal 3 is arranged to seal the hydrogen gas flowing into the clearance δ. Here, when the rod-shaped member 2 repeatedly slides in the main body portion 1, a sliding portion R (FIG. 2) of the rod-shaped member 2 wears to generate damages and deformations (recesses and so on) thereon. When the abrasion generates and portions of the rod-shaped member 2 on which the damages and the deformations generate locates on a radially inner region of the cup seal 3, sealing function of the cup seal 3 is not performed, and hydrogen gas passes through the portions on which the damages and the deformations generate between the cup seal 3 and the rod-shaped member 2 to leak outside the main body portion 1 (nozzle 10).

In order to treat the above situation generated by the abrasion of the rod-shaped member 2, in the illustrated reference example is mounted a mechanism for protecting the outer peripheral surface of the rod-shaped member 2 from slide on the sealing member holding member 4. That is, the mechanism for protecting the outer peripheral surface of the rod-shaped member 2 is constituted by coating a radially inner side surface of the sealing member holding member 4 with a material (resin, Al or Cu, for instance) whose hardness is lower than that of a material (for example, stainless steel) of the rod-shaped member 2. Or, the mechanism may be constituted by coating at least a surface of the portion R of the rod-shaped member 2 with a material (glass or carbon-based material, for instance) whose hardness is higher than that of a material (for example, stainless steel) of the sealing member holding member 4. Further, the whole rod-shaped member 2 may be constituted by a material whose hardness is higher than that of a material of the sealing member holding member 4. In the illustrated reference example with the above construction, even if slide of the rod-shaped member 2 is repeated, abrasion of the portion R of (the outer peripheral surface of) the rod-shaped member 2 is prevented, and the damages and deformations (recesses and so on) are not generated, and under a condition that the filling nozzle 10 and the receptacle 20 are connected with each other, even if the sliding portion R where the rod-shaped member 2 slides on the sealing member holding member 4 locates on the radially inner side region of the cup seal 3, (since the damages and the deformations are not generated on the surface of the rod-shaped member 2,) hydrogen gas does not leak via a portion between the cup seal 3 and the rod-shaped member 2 outside the main body portion 1 (nozzle 10).

Figure 3:
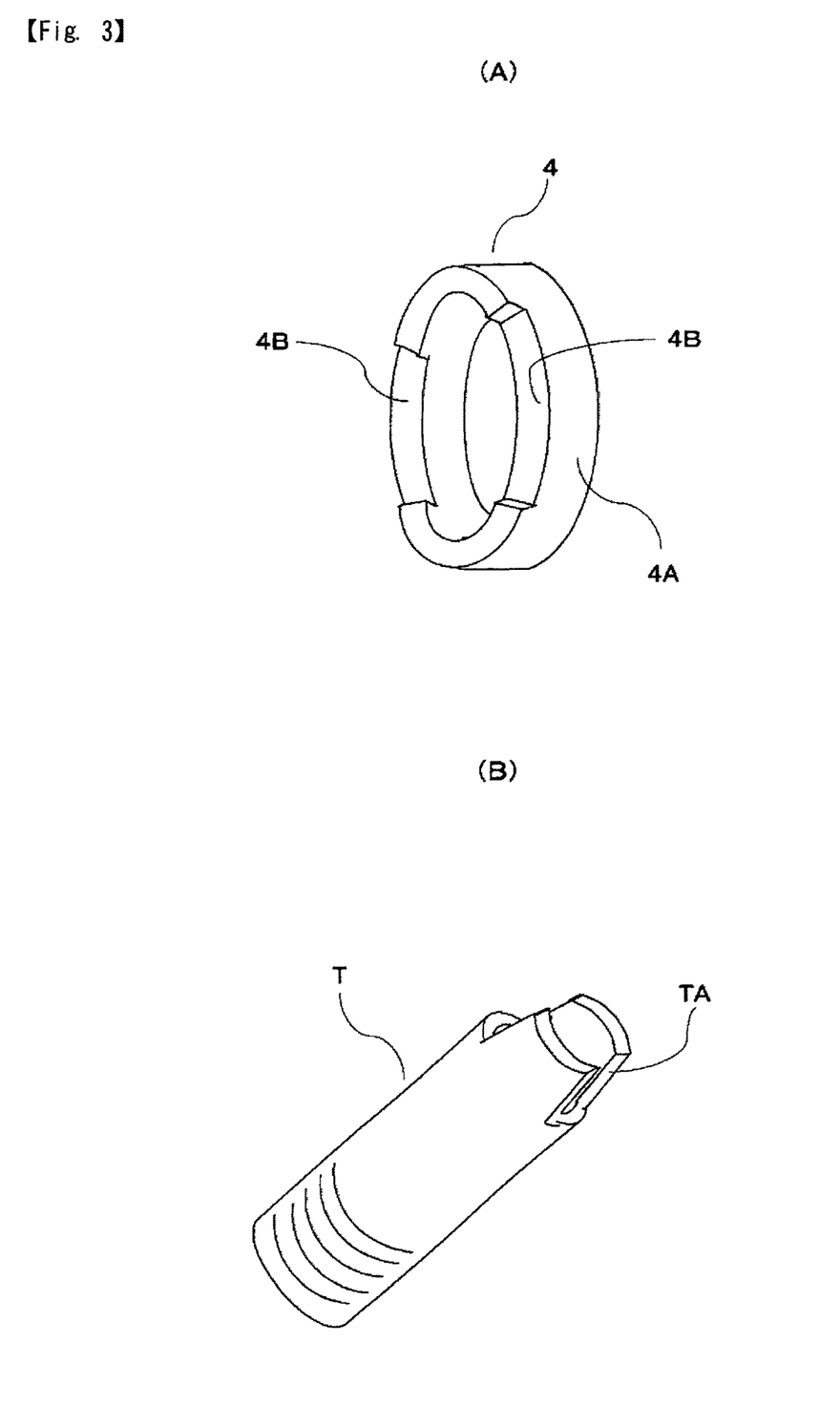
FIG. 3 is a perspective view showing a sealing member holding member shown in FIGS. 1 and 2, and a tool for fastening the sealing member holding member in a main body portion of the filling nozzle.

In order to prevent the cup seal 3 energized by high pressure hydrogen gas from moving in the receptacle 20 side when hydrogen is filled, the sealing member holding member 4 is strongly fixed to an inner periphery of the main body portion 1 by well-known means such as a screw. In FIG. 3(A) is shown an example of the sealing member holding member 4. In FIG. 3(A), on an outer peripheral surface of the sealing member holding member 4 is formed a male screw 4A, and the male screw 4A is screwed with a female screw (not shown) on an inner periphery of the main body portion 1. In addition, in FIG. 3(A), in a left end surface of the sealing member holding member 4 (end surface separated from the cup seal 3 when the sealing member holding member 4 is attached to the main body portion 1) are formed slits 4B. When the sealing member holding member 4 is fixed to the inner periphery of the main body portion 1, by an exclusive tool T shown in FIG. 3(B), engaging portions TA of the tool T are engaged with the slits 4B of the sealing member holding member 4, and the tool T is rotated to fasten the male screw 4A of the sealing member holding member 4 to the female screw (not shown) on the inner periphery of the main body portion 1 tightly, and the sealing member holding member 4 is strongly fixed to the main body portion 1.

In the illustrated reference example is mounted a clutch mechanism 12 for maintaining connected condition between the filling nozzle 10 and the receptacle 20. In FIG. 1, on a radially outer side of the in-main-body passage 1A, and on the receptacle 20 side (left side in FIG. 1) is mounted a clutch 13 with a hollow cylinder shape. An engaging portion 13A formed on an end portion on a hydrogen supply source side of the clutch 13 (right side in FIG. 1) is fitted to a clutch fitting channel 1J to be fixed. On the other hand, on a receptacle side end portion (left side in FIG. 1) of the clutch 13 is mounted a swelling portion 13B, and the swelling portion 13B is fitted into a fitting channel 20A of the receptacle 20 as shown in FIG. 2 when the filling nozzle 10 and the receptacle 20 are connected with each other (when hydrogen is filled).

On a radially outer side of the clutch 13 is mounted a lever 14. On the lever 14 is integrally mounted a lever handle 14A, and a worker not shown grasps the lever handle 14A to move the lever 14 in the arrow H direction between a position where the swelling portion 13B of the clutch 13 is prevented from being detached from the fitting channel 20A of the receptacle 20 and a position where the swelling portion 13B of the clutch 13 is detachable from the fitting channel 20A of the receptacle 20. In FIGS. 1 and 2, on the main body portion 1 are formed a lever opening portion 1K permitting arrow H-direction movement of the lever 14, and a lever moving passage 1L.

Under a condition shown in FIG. 2, a receptacle side end portion (left end portion in FIG. 2) of the lever 14 is supported at a position on a radially outer side of the swelling portion 13B of the clutch 13, and the clutch 13 is prevented from being detached from the fitting channel 20A of the receptacle 20. The clutch mechanism 12 has a projection 14B (projection of the lever) projecting on a radially inner side, the projection being mounted on the receptacle side (left side in FIG. 2) end portion of the lever 14, and an elastic member 15 (O-ring, for instance) with a ring shape arranged on a side separated from the receptacle 20 (right side in FIG. 2) compared to the projection 14B of the lever. The ring-shaped elastic member 15 is fitted to an elastic material channel 14C formed near the receptacle side end portion of the lever 14.

When hydrogen is filled, the filling nozzle 10 and the receptacle 20 are connected with each other as shown in FIG. 2, and a hydrogen gas flows in the in-main-body passage 1A, the in-rod passage 2B and the in-receptacle passage 20B in this order. At this time, the hydrogen gas is extremely high in pressure (70 MPa for example), so that a tensile force F1 (FIG. 2) separating the main body portion 1 from the receptacle 20 acts thereon. As a result that the tensile force F1 acts, by an action between an inclined surface 13BA located on the side (right side in FIG. 2) that is separated from the receptacle 20 of the swelling portion 13B of the clutch 13 and an inclined surface 20AA located on the side (right side in FIG. 2) that is separated from the receptacle 20 of the receptacle engaging channel 20A, a radially outward force RO acts on the clutch 13 as a component force of the tensile force F1 to move the clutch 13 outward in a radial direction.

Figure 4:
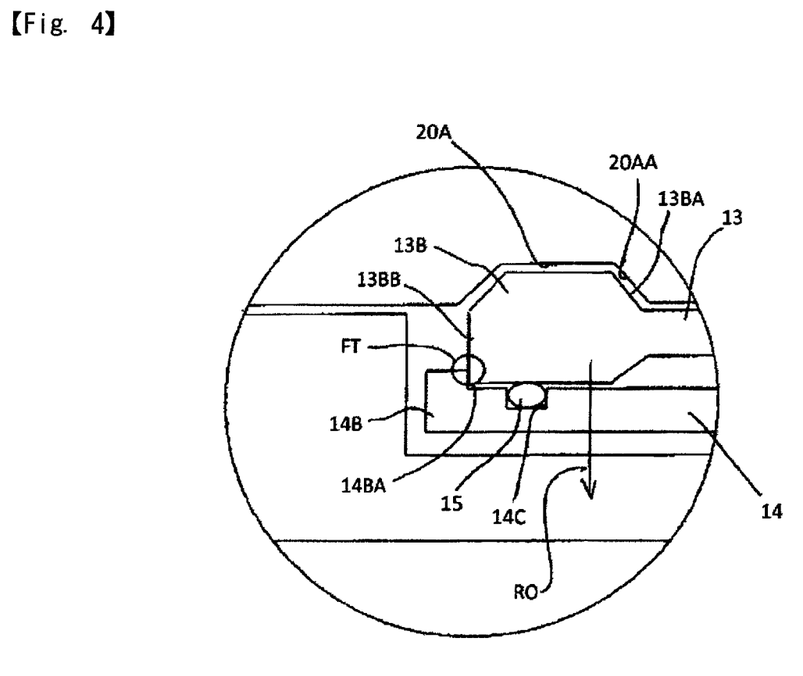
FIG. 4 is an enlarged view of the part pointed by symbol F4 in FIG. 2.

As shown in FIG. 4 enlarging a part F4 in FIG. 2, when the clutch 13 moves outward in a radial direction by the radially outward force RO, the elastic member 15 is squeezed in a radial direction. As a result, the end surface 13BB of the swelling portion 13B of the clutch 13 and the end surface 14BA of the projection 14B of the lever 14 abut with each other in the region FT, and the lever 14 cannot move from the condition shown in FIG. 4 in a direction separating from the receptacle 20, that is, on a right side in FIGS. 2 and 4. Therefore, the lever 14 continues positioning outward the swelling portion 13B of the clutch 13 in a radial direction to prevent the swelling portion 13B of the clutch 13 from being disengaged from receptacle fitting channel 20A of the receptacle 20, that is, disengagement of the main body portion 1 and the receptacle 20 can be prevented. To exhibit action effect described above is properly designed elastic coefficient of the elastic member 15, projecting amount of the elastic member 15 to the crutch 13, projecting amount of the projection 14B of the lever 14 to the crutch 13, inclination angle of the inclined surface 13BA of the swelling portion 13B (FIGS. 2 and 4), inclination angle of the inclined surface 20AA of the receptacle engaging channel 20A (FIGS. 2 and 4), and so on. In addition, in FIGS. 1 and 2, the numeral 16 indicates a lever position moving mechanism for locating the lever 14 on a radially outer side of the receptacle 20 side end of the clutch mechanism 12 when the filing nozzle 10 and the receptacle 20 are connected with each other.

In FIGS. 2 and 4, when filling hydrogen gas is finished and a predetermined depressurizing work is completed, the tensile force F1 (FIG. 2) resulting from high pressure of the hydrogen gas disappears. In accordance with the above, the radially outward force RO acting on the clutch 13 also disappears to allow the clutch 13 to return to a radially inner position (position before hydrogen gas is filled). Therefore, the ring-shaped elastic member 15 mounted adjacent to an end of the lever 14 returns to a cross-sectionally circular shape from the squeezed shape shown in FIG. 4, and the end surface 13BB and the end surface 14BA do not contact with each other, and the lever 14 becomes, unlike the condition shown in FIG. 4, movable in a direction (right side FIGS. 2 and 4) separating from the receptacle 20. Then, when the lever 14 moves in the direction (right side FIGS. 2 and 4) separating from the receptacle 20, the lever 14 does not position outward the swelling portion 13B of the clutch 13 in a radial direction, and it becomes possible that the swelling portion 13B of the clutch 13 detaches from the engaging channel 20A of the receptacle 20, and the connection between the main body portion 1 (filling nozzle 10) and the receptacle 20 can be released.

With the filling apparatus 100 according to the reference example shown in FIGS. 1 to 4, the inner surface of the sealing member holding member 4 suppresses radial movement of the rod-shaped member 2, so that "rattling" of the rod-shaped member 2 can be suppressed. In addition, the mechanism for protecting the outer peripheral surface of the rod-shaped member 2 from slide on the sealing member holding member 4 is constituted by coating the inner peripheral surface of the sealing member holding member 4 with a material whose hardness is lower than that of a material of the rod-shaped member 2, or by coating the surface of the rod-shaped member 2 with a material whose hardness is higher than that of a material of the sealing member holding member 4, or by making a material of the rod-shaped member 2 itself higher than that of a material of the sealing member holding member 4. Therefore, even if opening and closing of the valve mechanism (valve element 2A and so on) in the filling nozzle 10 are repeated, on the outer peripheral surface of the rod-shaped member 2 (particularly, on the radially inner portion R of the cup seal 3 under the condition that the filling nozzle 10 and the receptacle 20 are connected with each other as shown in FIG. 2) do not generate damages and deformations (recesses and the like). As a result, even if the rod-shaped member 2 locates on the radially inner side of the cup seal 3 under the condition that the filling nozzle 10 and the receptacle 20 are connected with each other (FIG. 2), the damages and the deformations do not exist on the surface of the rod-shaped member 2, so that hydrogen gas does not leak outside the main body portion 1 (nozzle 10).

In addition, when the sealing member holding member 4 is fixed to the inner periphery of the main body portion 1 by a screw, the sealing member holding member 4 is fastened after the exclusive tool T is engaged with the slits 4B of the sealing member holding member 4, so that the sealing member holding member 4 is strongly fixed to the main body portion 1. Therefore, the sealing member holding member 4 does not detach from the main body portion 1, and can prevent that the cup seal 3 energized by high pressure hydrogen gas from moving on the receptacle 20 side.

In the illustrated reference example, since the sealing member holding member 4 has a function of preventing the rod-shaped member 2 from moving radially (so-called "rattling"), it is not necessary to separately mount a guide member projecting radially inward on the receptacle 20 side of the main body portion 1, and a movement margin for opening and closing the valve between the guide member (guide member mounted separately) and the cup seal 3. Then, by the movement margin, the axial dimension of the rod-shaped member 2 of the filling nozzle 10 can be made small, and the whole filling apparatus can be made compact.

In addition, in the illustrated reference example, when the filling nozzle 10 and the receptacle 20 (vehicle side filling port) are connected with each other, the valve element 2A of the rod-shaped member 2 is separated from the valve seat 1M, and the valve mechanism is opened, and the passage between the hydrogen introducing port 1B and the receptacle 20 (vehicle side filling port) is opened, and hydrogen gas can be filled, so it is safe. Then, with the illustrated reference example is mounted the clutch mechanism 12 for maintaining the connected condition between the filling nozzle 10 and the receptacle 20 (vehicle side filling port), so that when hydrogen is filled after the filling nozzle 10 and the receptacle 20 are connected with each other, the filling nozzle 10 cannot be detached from the receptacle 20 during hydrogen filling pressure acts. Since the clutch mechanism 12 is a mechanical mechanism, and is not operated by a fluid such as hydrogen gas, it is not necessary to mount a fluid circuit, a sealing structure (O-ring and so on) for an operating fluid, and so on. Therefore, there is no possibility that the operation gas (hydrogen gas and so on) leaks, so it is certain.

Figure 5:
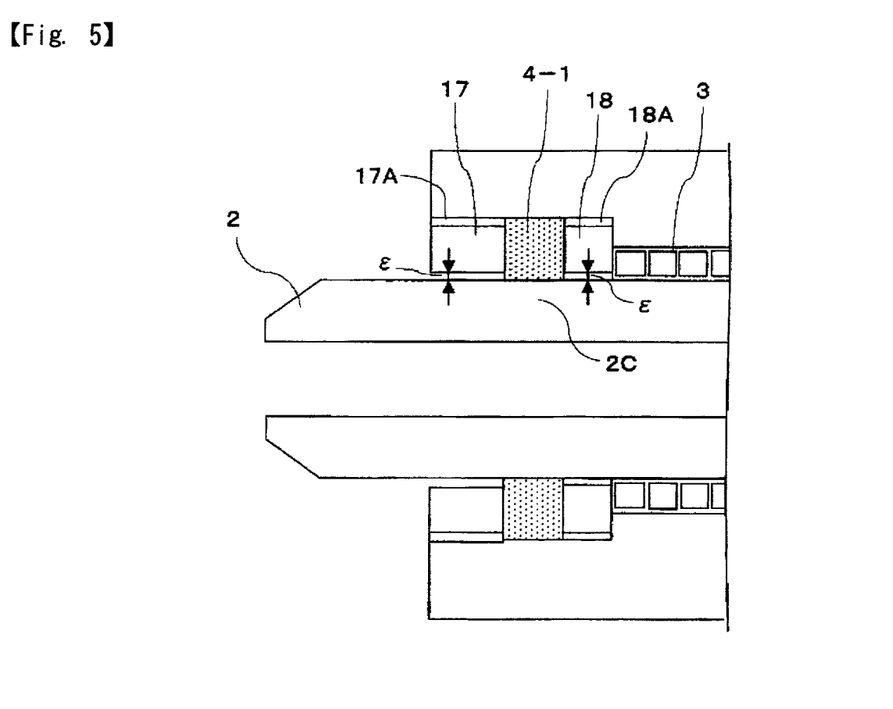
FIG. 5 is a partially enlarged cross sectional view showing an embodiment of the present invention.

Next, an embodiment of the present invention will be explained with reference to the FIG. 5. In the embodiment shown in FIG. 5, the whole sealing member holding member 4-1 is constituted by a material (for example, resin) whose hardness is lower than that of a material (for example, stainless steel) of the rod-shaped member 2. On an end side of the sealing member holding member 4-1 (receptacle 20 side, left side in FIG. 5) is arranged the first holding member 17. The first holding member 17 is screwed to an inner periphery of the main body portion 1 by a screw. In FIG. 5, the symbol 17A indicates a male screw formed on the first holding member 17. An inner surface of the first holding member 17 is separated from (an outer peripheral surface of) the rod-shaped member 2, and the numeral ε indicates (a dimension of) a clearance between the inner peripheral surface of the first holding member 17 and the outer peripheral surface of the rod-shaped member 2. Therefore, the holding member 17 does not contact the rod-shaped member 2 moving in an axial direction. On the cup seal 3 side (hydrogen supply source side, right side in FIG. 5) of the sealing member holding member 4-1 is arranged the second holding member 18. As same as the first holding member 17, the second holding member 18 is screwed with the inner periphery of the main body portion 1 also, and the symbol 18A shown in FIG. 5 indicates a male screw formed on the second holding member 18. Then, the inner surface of the second holding member 18 is also separated from the rod-shaped member 2, and (a dimension of) a clearance between the inner surface of the second holding member 18 and the outer peripheral surface of the rod-shaped member 2 is indicated by the symbol ε also. Therefore, the second holding member 18 does not contact the rod-shaped member 2 moving in the axial direction also.

As same as the reference example shown in FIGS. 1 to 4, the inner diameter dimension of the sealing member holding member 4-1 is almost the same as the outer diameter of the large diameter portion 2C of the rod-shaped member 2, and the sealing member holding member 4-1 has a function of preventing so-called "rattling" of the rod-shaped member 2 by supporting it on an end side (receptacle 20 side). Since the sealing member holding member 4-1 is constituted by a material (for example, resin) whose hardness is lower than that of a material of the rod-shaped member 2 (for example, stainless steel), as same as the reference example shown in FIGS. 1 to 4, on a portion of (the outer peripheral surface of) the rod-shaped member 2 sliding on the sealing member holding member 4-1 are not generated damages and deformations (recesses and so on), and a hydrogen gas does not leak via a clearance between the surface of the rod-shaped member 2 and the inner surface of the cup seal 3 outside the main body portion 1 (nozzle 10) at filling of hydrogen.

Then, since the first holding member 17 and the second holding member 18 are arranged to sandwich the sealing member holding member 4-1, it is prevented that the sealing member holding member 4-1 is pressed in an axial direction (horizontal direction in FIG. 5) of the rod-shaped member 2 when hydrogen is filled. Therefore, it is prevented that the sealing member holding member 4-1 expands in a radially inner direction to prevent the rod-shaped member 2 from moving in an axial direction also. In addition, the second holding member 18 is screwed to the inner periphery of the main body portion 1, and the sealing member holding member 4-1 is inserted into the main body portion 1, and the first holding member 17 is screwed to the main body portion 1 to sandwich the sealing member holding member 4-1, which exhibits a function effect of easy assembling. The other constructions and function effects of the embodiment shown in FIG. 5 are the same as those of the reference example shown in FIGS. 1 to 4.

Since the embodiment shown in the drawings are merely example, and the embodiment does not limit the technical scope of the present invention. For example, although the hydrogen filling apparatus is explained in the illustrated embodiment, the present invention can be applied to a CNG filling apparatus.

DESCRIPTION OF THE REFERENCE NUMERALS 1 main body portion
2 rod-shaped member (connecting pin)
2A valve element
3 coupling (sealing member)
4, 4-1 sealing member holding members (pressing members)
5 spring (elastic material)
10 filling nozzle
12 clutch mechanism
17 first holding member
18 second holding member
20 receptacle
100 filling apparatus

The invention claimed is:

1. A filling apparatus comprising:
   a storage tank for storing hydrogen;
   a filling nozzle for filling the hydrogen from the storage tank through a fuel filling system to an in-vehicle hydrogen filling tank mounted on a vehicle;
   a rod-shaped member and a main body portion mounted on the filling nozzle, the rod-shaped member accommodating flow of the hydrogen, the main body portion covering the rod-shaped member;
   a sealing member arranged between the main body portion and the rod-shaped member; and
   a sealing member holding member mounted on an end side of the rod-shaped member, the sealing member holding member sandwiched by two holding members which each define an inner peripheral surface, the sealing member holding member being slidable along an outer peripheral surface of the rod-shaped member while protecting the outer peripheral surface, and each of the two holding members being threadably connected to the main body portion under a condition that the inner peripheral surface thereof is separated from the outer peripheral surface of the rod-shaped member.

2. The filling apparatus as claimed in claim 1, further comprising a clutch mechanism for maintaining a connected state between the filling nozzle and a vehicle side filling port.

3. The filling apparatus as claimed in claim 1, further comprising: a valve element mounted on a fuel filling system side end portion of the rod-shaped member, and an elastic material for energizing the valve element in a direction that a valve is closed.

4. The filling apparatus as claimed in claim 3, further comprising a clutch mechanism for maintaining a connected state between the filling nozzle and a vehicle side filling port.

5. The filling apparatus as claimed in claim 1, wherein the mechanism for protecting the outer peripheral surface of the rod-shaped member from slide on the sealing member holding member is constituted by coating a radially inner peripheral surface of the sealing member holding member with a material whose hardness is lower than that of a material of the rod-shaped member.

6. The filling apparatus as claimed in claim 5, further comprising: a valve element mounted on a fuel filling system side end portion of the rod-shaped member, and an elastic material for energizing the valve element in a direction that a valve is closed.

7. The filling apparatus as claimed in claim 5, further comprising a clutch mechanism for maintaining a connected state between the filling nozzle and a vehicle side filling port.

* * * * *